US005744527A

United States Patent [19]
Katsumata et al.

[11] Patent Number: 5,744,527
[45] Date of Patent: *Apr. 28, 1998

[54] POLYACETAL RESIN COMPOSITION

[75] Inventors: Toru Katsumata; Nobuyuki Matsunaga, both of Fuji, Japan

[73] Assignee: Polyplastics Co., Ltd., Japan

[*] Notice: The term of this patent shall not extend beyond the expiration date of Pat. No. 5,502,093.

[21] Appl. No.: 302,932

[22] PCT Filed: Jul. 7, 1994

[86] PCT No.: PCT/JP94/01112

§ 371 Date: Sep. 22, 1994

§ 102(e) Date: Sep. 22, 1994

[87] PCT Pub. No.: WO95/02012

PCT Pub. Date: Jan. 19, 1995

[30] Foreign Application Priority Data

| Jul. 7, 1993 | [JP] | Japan | 5-167707 |
| Jul. 7, 1993 | [JP] | Japan | 5-167708 |
| Sep. 2, 1993 | [JP] | Japan | 5-218671 |

[51] Int. Cl.$^6$ .................................................. C08K 5/35
[52] U.S. Cl. .............................. 524/99; 524/512; 524/593
[58] Field of Search ........................... 524/99, 512, 593

[56] References Cited

U.S. PATENT DOCUMENTS

| 4,730,015 | 3/1988 | Ikenaga et al. | 524/99 |
| 5,086,095 | 2/1992 | Katsumata | 524/99 |
| 5,149,723 | 9/1992 | Hayes | 524/99 |
| 5,171,770 | 12/1992 | Kanagawa | 524/99 |
| 5,502,093 | 3/1996 | Katsumata et al. | 524/99 |
| 5,523,341 | 6/1996 | Kobayashi et al. | 524/99 |

FOREIGN PATENT DOCUMENTS

| 0259460 | 5/1963 | Australia | 524/99 |
| 0505202 | 9/1992 | European Pat. Off. | 524/99 |
| 63-193950 | 8/1988 | Japan . | |
| 3-180951 | 7/1990 | Japan . | |
| 3-14856 | 1/1991 | Japan . | |
| 3-14857 | 1/1991 | Japan . | |
| 3-14858 | 1/1991 | Japan . | |
| 3-205442 | 9/1991 | Japan . | |

*Primary Examiner*—Joseph L. Schofer
*Assistant Examiner*—N. Sarofin
*Attorney, Agent, or Firm*—Nixon & Vanderhye P.C.

[57] ABSTRACT

There is provided a polyacetal resin composition having excellent in weather and environmental resistances, in which resin degradation/discoloration and bleeding of additives/discoloration are suppressed to the utmost in extended exposure to light and an initial surface condition of a molded product is maintained.

Hundred parts by weight of the polyacetal resin (A) are blended with 0.01 to 2.0 parts by weight of the UV absorber (C), 0.01 to 1 part by weight of the low-molecular hindered amine series substance (D-1) having a molecular weight of less than 700 and 0.01 to 4 parts by weight of the high molecular hindered amine series substance (D-2) having a molecular weight of 700 or more. The oxyalkylene polymer (E) may be contained therein.

Further, there is provided the polyacetal resin composition containing a specific core-shell polymer, in which resin degradation/discoloration and discoloration attributable to bleeding of additives are suppressed to the utmost in extended exposure to light and which is excellent in a weather resistance and an environmental resistance and has a lowered surface gloss, and the molded product thereof.

17 Claims, No Drawings

POLYACETAL RESIN COMPOSITION

[FIELD OF THE INVENTION]

The present invention relates to a polyacetal resin having an excellent weather (light) resistance. More specifically, a UV absorber and two kinds of the specific hindered amine series light stabilizers are used in combination for a polyacetal resin to provide a polyacetal resin composition having excellent weather resistance and environment resistance, which suppresses resin deterioration and discoloration and gloss reduction caused by bleeding of additives in extended exposure to light to the utmost and maintains an initial molded product surface condition.

[PRIOR ART]

As known well, in recent years, a polyacetal resin is utilized in a very wide field as an engineering resin which excels in the physical characteristics such as a mechanical property and an electrical property and the chemical characteristics such as a chemical resistance and a heat resistance. However, expansion of the field in which the polyacetal resin is utilized is accompanied with further requirement of a specific property to the character thereof as a material in some cases. Further improvement in a weather (light) resistance is desired as one of such specific properties. That is, an environment in which the interior and exterior parts for automobiles and the parts for electric appliances are used under sun light, humidity (rain and bedewing) and other aerial contacting causes discoloration on a molded product surface and gloss reduction attributable to loss of a surface flatness and in addition, generates cracks on the parts surfaces to cause inconveniences such as damaging the appearances in some cases. In order to prevent these defects, it has so far been proposed to add various weather (light) stabilizers to the polyacetal resin to improve the weather (light) resistance of the polyacetal resin. In particular, it is known that combined use of various UV absorbers and hindered amine series light stabilizers give an effect to the weather (light) resistance.

However, in order to maintain the weather (light) resistance over a long period of time, a lot of the additives described above have to be added. However, addition in a lot of amounts brings about reduction of a mechanical property and provides a problem that in molding, adhesion and deposition (so-called mold deposit) on a die generate inferior dimension and poor appearance of a molded product. Further, in case of the polyacetal resin, since it is a high crystalline polymer, the additives are bleeded due to recrystallization caused by heat and a temperature difference (bedewing) under an exposing environment to cause discoloration and gloss reduction on a molded product surface and resultingly show the same action as resin deterioration. In particular, with respect to, for example, the automobile interior parts which are used under very high temperature or high humidity environment, the influences thereof are exerted to so large extent that addition of a lot of the additives causes damage of appearance on a molded product surface.

Accordingly, there has has been desired the development of a polyacetal resin material which does not have bleeding of the additives and maintains a molded product appearance over a long period of time while maintaining a weather (light) resistance.

[DISCLOSURE OF THE PRESENT INVENTION]

The intensive researches made by the present inventors in order to develop a polyacetal resin composition which suppresses surface discoloration caused by bleeding of the additives to the utmost and maintains an initial molded product surface status over a long period of time while maintaining an excellent weather (light) resistance without sacrificing the inherent characteristics of the polyacetal resin have resulted in coming to complete the present invention.

That is, the present invention is a polyacetal resin composition (I) characterized by blending:

(A) 100 parts by weight of a polyacetal resin, with (C) 0.01 to 2.0 parts by weight of a UV absorber and, (D) 0.01 to 1 part by weight of a low-molecular hindered amine series substance (D-1) having a molecular weight of less than 700 and 0.01 to 4 parts by weight of a high-molecular hindered amine series substance (D-2) having a molecular weight of 700 or more.

Further, the present invention is a polyacetal resin composition (II) characterized by blending:

(A) 100 parts by weight of a polyacetal resin, with (C) 0.01 to 2.0 parts by weight of a UV absorber, (D) 0.01 to 1 part by weight of a low-molecular hindered amine series substance (D-1) having a molecular weight of less than 700 and 0.01 to 4 parts by weight of a high-molecular hindered amine series substance (D-2) having a molecular weight of 700 or more and, (E) 0.1 to 10 parts by weight of an oxyalkylene polymer having chains of 2 to 8 consecutive carbon atoms.

As a polyacetal resin material which has an excellent weather (light) resistance without sacrificing the intrinsic characteristics of the polyacetal resin as much as possible and with which a gloss of a molded product surface is notably suppressed, the present invention relates to a polyacetal resin composition (III) having a low glossiness, prepared by blending:

(A) 100 parts by weight of a polyacetal resin, with (B) 1 to 50 parts by weight of a core-shell polymer having cores of a rubbery polymer and shells of a glassy polymer consisting of a vinyl series copolymer having an oxygen-containing polar group, (C) 0.01 to 2.0 parts by weight of a UV absorber, (D) 0.01 to 1 part by weight of a low-molecular hindered amine series substance (D-1) having a molecular weight of less than 700 and 0.01 to 4 parts by weight of a high-molecular hindered amine series substance (D-2) having a molecular weight of 700 or more and, (E) 0.1 to 10 parts by weight of an oxyalkylene polymer having chains of 2 to 8 consecutive carbon atoms, and the molded product thereof.

The constitutional components of the present invention will be explained below in detail.

First of all, the polyacetal resin (A) used in the present invention is a high molecular compound having an oxymethylene group (—$CH_2O$—) as a primary constitutional component and may be any one of a polyoxymethylene homopolymer, a copolymer having a little amount of the other constitutional components than the oxymethylene group, a terpolymer and a block copolymer. Further, the molecule thereof may have not only a linear but also branched or crosslinking structure. The polymerization degree thereof is not particularly limited.

Next, the core-shell polymer (B) used in the present invention has the cores of a rubbery polymer and the shells of a glassy polymer consisting of a vinyl polymer having an oxygen-containing polar group, and of the seed emulsion polymerization processes, it is usually obtained by a continuous multi-stage emulsion polymerization process in which a polymer at a preceding stage is covered in order with a polymer at a latter stage. In the case where the core-shell polymer has an intermediate layer which will be described later, the intermediate layer is formed in some cases by a multi-stage emulsion polymerization process in which the polymer obtained at the latter stage penetrates into the polymer obtained at the preceding stage.

In a grain-generating polymerization, an emulsion polymerization reaction is preferably initiated by putting a monomer, a surface active agent and water into a reactor and then adding a polymerization initiator.

A polymerization at the first stage is a reaction for forming a rubbery polymer.

The monomers constituting the rubbery polymer include, for example, conjugate diene or alkyl acrylate having a carbon number of 2 to 8 in an alkyl group or the mixture thereof.

These monomers are polymerized to form the rubbery polymer.

Such conjugate diene can include, for example, butadiene, isoprene and chloroprene. There can be enumerated as alkyl acrylate having the carbon number of 2 to 8 in the alkyl group, for example, ethyl acrylate, propyl acrylate, butyl acrylate, cyclohexyl acrylate and 2-ethylhexyl acrylate. In particular, butyl acrylate is preferably used as the rubbery polymer.

There can be copolymerized as well at the first stage polymerization, copolymerizable monomers such as conjugate diene and alkyl acrylate, for example, aromatic vinyl such as styrene, vinyltoluene and α-methylstyrene, aromatic vinylidene, cyanated vinyl such as acrylonitrile and methacrylonitrile, cyanated vinylidene, and alkyl methacrylate such as methyl methacrylate and butyl methacrylate.

In the case where conjugate diene is not included in the first stage polymerization or where while it is included, it falls in 20 weight % or less based on the whole monomer amount used at the first stage, a polymer having a high impact resistance can be prepared by using a small amount of a crosslinkable monomer or a grafted monomer.

The crosslinkable monomer can include, for example, an aromatic divinyl monomer such as divinylbenzene, and alkane polyol polyacrylate or alkane polyol polymethacrylate such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate and trimethylolpropane triacrylate, and trimethylolpropane trimethacrylate. In particular, butylene glycol diacrylate and hexanediol diacrylate are preferably used.

The grafted monomer can include, for example, unsaturated carboxylic acid allyl ester such as allyl acrylate, allyl methacrylate, diallyl maleate, diallyl fumarate and diallyl itaconate. In particular, allyl methacrylate is preferably used.

Such crosslinkable monomers and grafted monomers each are used in the range of 0 to 5 weight %, preferably 0.1 to 2 weight % based on the whole monomer amount used at the first stage.

The glassy polymer consisting of a vinyl series copolymer having an oxygen-containing polar group is formed in a shell phase.

In the present invention, the oxygen-containing polar group described above includes, for example, a hydroxyl group, a group having an ether bond (—O—) (for example, a glycidyl group), an amide group (—CONH—), an imide group (—C(=O)—NH—C(=O)—) and a nitro group (—NO$_2$). In particular, a hydroxyl group and a group having an ether bond are preferred.

In the core-shell polymer having no oxygen-containing polar group in the shell phase, a delustering effect (a gloss reduction effect) is scarcely observed. In a vinyl polymer which does not have the core-shell structure of the present invention while having the oxygen-containing polar group, the effect is not sufficient while it is observed.

As the monomer constituting the vinyl series copolymer described above having an oxygen-containing polar group, for example, (metha)acrylate of an alcohol having two or more oxygen-containing polar groups in a molecule is used, wherein the alcohol having two or more oxygen-containing polar groups in the molecule means an alcohol having at least one oxygen-containing polar group excluding a hydroxyl group at an alcohol portion. As (metha)acrylate of the alcohol having the oxygen-containing polar groups, for example, (metha)acrylate of the alcohol having a hydroxyl group and/or a glycidyl group is used.

(Metha)acrylate of the alcohol having the hydroxyl group can include, for example, hydroxyethyl (metha)acrylate and hydroxypropyl (metha)acrylate. Hydroxyethyl methacrylate is preferably used.

(Metha)acrylate of the alcohol having the glycidyl group can include, for example, glycidyl (metha)acrylate, and glycidyl methacrylate is preferably used.

A vinyl monomer having the oxygen-containing polar group other than (metha)acrylate described above, such as, for example, allyloxyethanol and allyl glycidyl ether can also be used as a constitutional component for the vinyl series copolymer having the oxygen-containing polar group.

A monomer constituting the glassy polymer other than the monomers described above having the oxygen-containing polar groups can include, for example, vinyl polymerizable monomers including alkyl (metha)acrylate such as methyl (metha)acrylate, ethyl (metha)acrylate and butyl (metha) acrylate, aromatic vinyl such as styrene, vinyltoluene and α-methylstyrene, aromatic vinylidene, cyanated vinyl such as acrylonitrile and methacrylonitrile, and cyanated vinylidene. Methyl methacrylate, styrene and acrylonitrile are particularly preferably used.

This shell phase resides preferably in a range of 10 to 50 weight % based on the whole core-shell polymer. When this shell phase is less than this weight range, a weather resistance is insufficient and when it exceeds it, a mechanical property of a resin composition obtained by fusing and mixing the core-shell polymer formed is not sufficient in some cases.

Further, an intermediate phase may be present between the polymerized phases at the first stage and the final stage. The intermediate phase is formed by subjecting, for example, a polymerization monomer forming a glassy polymer, such as a polymerization monomer having a functional group including glycidyl methacrylate, methacrylic acid and hydroxyethyl methacrylate, and methyl methacrylate, and a polymerization monomer forming a rubbery polymer, such as butyl acrylate to a seed emulsion polymerization.

Such intermediate phase can variously be selected according to a character of the desired core-shell polymer.

The structure of the core-shell polymer having such intermediate phase includes, for example, those which take a multi-layer system structure in which one more layer is present between the core and the shell and those which take a salami structure in which the intermediate phase is dispersed in the core in a form of fine particles. In the core-shell polymer having the salami structure, in further extreme case, the intermediate phase to be dispersed sometimes forms a new core at the central part of the core. The core-shell polymer of such structure is formed in some cases when a monomer represented by styrene is used as an intermediate phase-constituting monomer.

In the case where the core-shell polymer having the intermediate phase is used, improvement in an impact resistance, improvement in a bending elastic modulus, increase in a heat deforming temperature, and appearance (suppress in surface peeling and pearl gloss, and change in a color tone due to change in a refraction index) are improved in several cases.

The emulsion polymerization is carried out by using, for example, a surface active agent such as a nonionic surface active agent and an oligomer type anionic or nonionic surface active agent and a polymerization initiator such as an azo series polymerization initiator and a peroxide series polymerization initiator.

There can be used as the nonionic surface active agent used in the present invention, almost all of the nonionic surface active agents which are used widely and generally including an ether type such as polyoxyethylenenonyl phenyl ether, polyoxyethylenestearyl ether and polyoxyethylenelauryl ether, an ester type such as polyoxyethylene monostearate, a sorbitan ester type such as polyoxyethylenesorbitan monolaurate, and a block polymer type such as a polyoxyethylene-polyoxypropylene block copolymer.

The oligomer type anionic or oligomer type nonionic surface active agent used in the present invention includes the oligomer type surface active agents which have so far been used for an emulsion polymerization product in a specific application and, for example, the oligomer type surface active agent of the following formula is used:

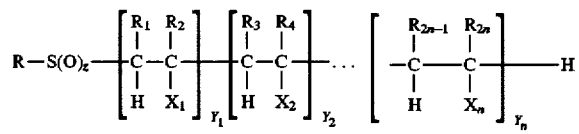

In the above formula, R is an alkyl group having a carbon number of 5 to 20, preferably 6 to 12; n represents an integer of 2 or more; Z is 0, 1 or 2, preferably 0 or 1 and particularly preferably 0; $R_{2n-1}$ each is —H, —CH$_3$, —C$_2$H$_5$ or —COOH; $R_{2n}$, each is —H, —CH$_3$, —C$_2$H$_5$, —COOH or —CH$_2$COOH; $X_n$ is —COOH, —CONH$_2$, —OCH$_3$, —OC$_2$H$_5$, —CH$_2$OH,

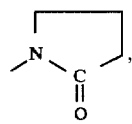

—COOC$_2$H$_4$OH, —COOC$_3$H$_6$OH, —CONHCH$_2$OH, —CONHCH$_3$, —CONHC$_2$H$_5$, —CONHC$_3$H$_7$, —COOCH$_3$, —COOC$_2$H$_5$, —CN, —OCOCH$_3$, —OCOC$_2$H$_5$, or

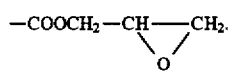

The oligomer type surface active agent used in the present invention has a molecular weight of not much more than 200 to 5000, preferably not much more than 1500 to 3000 and a polymerization degree $$\sum_{m=1}^{m} Y_a$$

of not much more than 6 to 50.

The above oligomer type surface active agent is already water soluble or is reacted with oxide, hydroxide or alcohol to be converted to a water soluble salt.

The above water soluble salt includes, for example, an alkaline metal salt, an alkaline earth metal salt, a III group heavy metal salt, an ammonium salt and a substituted ammonium salt. In particular, the ammonium salt is preferred.

As described in, for example, JP-B-47-34832, the above oligomer type surface active agent is obtained by addition-polymerizing a suitable monomer in a solvent containing no water in the presence of alkylmercaptan or then oxidizing to corresponding sulfoxide or sulfone with hydrogen peroxide or ozone.

There are used as alkylmercaptan described above, for example, alkylmercaptan such as n-octylmercaptan, n-dodecylmercaptan, t-dodecylmercaptan and n-decylmercaptan.

There are used as the monomer described above, for example, α,β-ethylene series unsaturated monomer having one or more polar groups in a molecule, such as (metha)acrylic acid, α-ethylacrylic acid, β-methylacrylic acid, α,β-dimethylacrylic acid, caproic acid, itaconic acid, fumaric acid, maleic acid, (metha)acrylamide, vinyl ethyl ether, vinyl methyl ether, allyl alcohol, vinylpyrrolidone, (metha)acrylonitrile, ethylacrylonitrile, methyl (metha)acrylate, ethyl acrylate, hydroxyethyl (metha)acrylate, hydroxypropyl (metha)acrylate, vinyl acetate, vinyl propionate, N-isopropylacrylamide, N-ethylacrylamide, N-methylacrylamide, glycidyl (metha)acrylate, and N-methylolacrylamide.

Lower alkanol such as, for example, methanol, ethanol and isopropanol is preferred as the solvent used in addition polymerization.

The addition polymerization described above is usually carried out in a range of 20° to 100° C.

In the present invention, an addition amount of the surface active agent is suitably selected according to a particle stabilizing ability of the surface active agent.

There are used as the polymerization initiator singly or in combination of two or more kinds, an azo series polymerization initiator such as azobisisobutyronitrile, dimethyl 2,2'-azobisisobutyrate and 2,2'-Azobis(2-amidinopropane) dihydrochloride, and a peroxide series polymerization initiator such as cumene hydroperoxide, diisopropylbenzene hydroperoxide and hydrogen peroxide.

An emulsion polymerization carried out in a reaction system in which there are used the nonionic surface active agent and/or the oligomer type surface active agent and the azo series and/or peroxide series polymerization initiators each described above provides the core-shell polymer which does not substantially contain a sulfur oxide compound or contains only a little bit if containing.

Herein, a content of the sulfur oxide compound (for example, sulfate, a sulfuric ester salt, persulfate, sulfite and sulfonate) means a level at which it is not detected with an ordinary qualitative test for the sulfur oxide compound.

The measuring method therefor includes, for example, a method in which a sample (the core-shell polymer) 5 g is weighed out in a 50 ml conical flask; ion-exchanged water 20 ml is added and stirred for 3 hours with a magnetic stirrer; then, a filtrate obtained by filtering with a No. 5C filter paper is divided into two portions; and a 1% barium chloride aqueous solution 0.5 ml is added to one to compare and observe generation of turbidity (a qualitative test for a sulfuric acid ion).

This core-shell polymer which does not substantially contain the sulfur oxide compound is stably melted and blended in a polyacetal resin and the polyacetal resin becomes excellent in delustering, a heat stability, an impact resistance and an elongation.

The core-shell polymer of the present invention can be taken out in a form of a particle, a flake or a powder, for example, with the following method:

(1) the surface active agent and the polymerization initiator each described above are used to prepare a latex by a publicly known seed emulsion polymerization process;

(2) then, a polymer is separated from the above latex by freezing and thawing; and (3) subsequently, it is dewatered by centrifugalization and dried.

A majority of a solvent and a surface active agent which are used during an emulsion polymerization can be removed by such take-out operation.

Or, the latex is dried as it is at the stage (2) and can be used.

A spray drying method with a spray dryer is also one of the methods for taking out the core-shell polymer from the latex.

The core-shell polymer thus taken out may further be pelletized with an extruder and a pelletizer or can be melted and mixed in a resin as it is.

An addition amount of the core-shell polymer (B) of the present invention per 100 parts by weight of the polyacetal resin is 1 to 50 parts by weight, preferably 3 to 20 parts by weight. Too little amount of the core-shell polymer does not sufficiently reveal a surface gloss reduction effect and uselessly excessive addition lowers a mechanical property, particularly a rigidity to a large extent. Further, an adverse influence is exerted to a heat stability.

Such core-shell polymer (B) is added and blended into the polyacetal resin to evenly lower a gloss on a molded product surface without reducing an excellent mechanical property of the polyacetal resin. Such lowering effect of a glossiness is considered to be attributable to that in a molded product obtained by blending the core-shell polymer into the polyacetal resin, the core-shell polymer is dispersed on the surface thereof in a form of particles of not much more than 0.5 to 2 μm to roughen a polyacetal resin surface and that in addition thereto, the oxygen-containing polar groups are evenly dispersed on the surface, which modify a surface of the polyacetal resin molded product and provide low gloss.

In the present invention, a degree of a surface gloss means that a glossiness measured by the measuring method described later (using a specular die) is preferably 30% or less, further preferably 25% or less and particularly preferably 20% or less in terms of a practical use. In accordance with advancement of an automobile interior to a higher grade and in order to improve touch, crimp processing which is called leather crimp and crepe crimp is provided to a majority of the interior parts and in addition to lowering of gloss on a specular face, a high transferability on a crimp processing face is necessitated. An ordinary polyacetal resin has an inferior transferability, which is supposed to be attributable to the high crystallinity thereof, and a reducing rate is small as compared with a gloss reduction on a specular face. In the composition of the present invention, the transferability on a crimp processing face is improved very much by modifying a surface of a polyacetal molded product and the gloss on the crimp processing surface is further more reduced.

With respect to the molded product according to the present invention, preferred is a molded product obtained by molding a resin composition with an injection molding machine equipped with an injection molding die which is subjected to a crimp processing in a die inside and having a crimp form on the surface thereof. A molded product having a crimp form includes the molded products having the crimp form on a part or all of the surface of the molded product. Accordingly, a part or all of the inside of the die used therefor is better subjected to the crimp processing according to the purposes thereof. The crimp processing on the die inside can be carried out by corrosion processing such as chemical etching and discharge processing and a surface roughness on a crimp pattern can be selected according to an appearance of a molded product to be aimed.

While such core-shell polymer (B) is thereby partly improved in a weather (light) resistance, it can not reveal a sufficient effect. The UV absorber (C) and the specific hindered amine series substance (D) which will be explained below can be used in combination with such core-shell polymer (B) and further, the specific oxyalkylene polymer (E) can be blended to provide a composition which provides a marked synergistic effect and has such excellent weather resistance and low glossiness that discoloration and generation of crack are suppressed even under irradiation of light over a long period of time to provide a very excellent weather (light) resistance and discoloration caused by bleeding of additives is controlled to maintain an initial appearance of a molded product and which has the well balanced characteristics the polyacetal resin intrinsically possesses.

In the present invention, of the UV absorbers (C) which are used for such purposes, those preferably used include a benzotriazole series substance, a benzophenone series substance, an aromatic benzoate series substance, a cyanoacrylate series substance, and an oxalic anilide series substance. Of them, the benzotriazole series substance and/or the benzophenone series substance are preferred. Among them, the examples of the particularly preferred substances include the following ones.

That is, the benzotriazole series substance includes 2-(2'-hydroxy-5'-methyl-phenyl)benzotriazole, 2-(2'-hydroxy-3', 5'-di-t-butyl-phenyl)benzotriazole, 2-(3,5-di-t-amyl-2-hydroxyphenyl)benzotriazole, 2-(2'-hydroxy-3',5'-di-isoamyl-phenyl)benzotriazole, 2-[2-hydroxy-3,5-bis-(α,α-dimethylbenzyl)phenyl]-benzotriazole, and 2-(2'-hydroxy-4'-octoxyphenyl)benzotriazole. The benzophenone series substance includes 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and 2-hydroxy-4-oxybenzylbenzophenone.

A blending amount of the UV absorber (C) used herein is suitably 0.01 to 2 parts by weight (per 100 parts by weight of the polyacetal resin), particularly preferably 0.05 to 1 part by weight. In the case where the component (C) is too little, an effect can not be expected and uselessly too much addition not only is economically disadvantageous but also results in bringing about the problems such as reduction in a mechanical property and stain of a die.

Sole blending of such UV absorber (C) into the polyacetal resin (A) does not sufficiently improve the weather (light)

resistance and it is generally used in combination with a hindered amine series substance.

However, as described above, the weather (light) resistance is not necessarily sufficient as well in such polyacetal resin composition according to a use condition and increase in an amount of a weather resistance stabilizer can not allow an effect of improving the weather resistance to be expected in comparison with the amount thereof. Use of the weather resistance stabilizer in a large amount expedites bleeding of the stabilizer in an environmental condition in which a temperature difference is relatively large like an inside of an automobile and bedewing is liable to take place, and it is piled up on a surface of a molded product to make the surface change (whitening), which results in damaging an initial surface condition.

Accordingly, in the present invention, two kinds having the different molecular weights are used as the hindered amine series substance (D) and blended into the polyacetal resin (A) containing the core-shell polymer in combination with the UV absorber (C) described above to thereby provide a polyacetal resin composition which has an excellent weather (light) resistance and in which discoloration and gloss reduction on a surface of a molded product caused by bleeding originating in a stabilizer such as a hindered amine series substance are suppressed and an initial surface condition can be maintained even under a light exposing environment over a long period of time.

In two kinds of the hindered amine series substances (D) with the different molecular weights used for such purposes, one is a low-molecular hindered amine series substance (D-1) having a molecular weight of less than 700 and another is a high-molecular hindered amine series substance (D-2) having a molecular weight of 700 or more. In the present invention, at least one kind each is used in combination.

The examples of the-low molecular hindered amine series substance (D-1) having the molecular weight of less than 700 used herein include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(2,2,6,6-tetramethyl-4-piperidyl)terephthate, 1,2-bis(2,2,6,6-tetramethyl-4-piperidyloxy)ethane, bis(2,2,6,6-tetramethyl-4-piperidyl)hexamethylene-1,6-dicarbamate, bis(1-methyl-2,2,6,6-tetramethyl-4-piperidyl)adipate, and tris(2,2,6,6-tetramethyl-4-piperidyl)benzene-1,3,5-tricarboxylate.

Preferred is the hindered amine series substance having the molecular weight of 600 or less and preferably used are bis(2,2,6,6-tetramethyl-4-piperidyl)sebacate and bis(1-methyl-2,2,6,6-tetramethyl-4-piperidyl)adipate.

Next, the examples of the high-molecular hindered amine series substance (D-2) having the molecular weight of 700 or more include tetrakis-(2,2,6,6-tetramethyl-4-piperidyl)1,2,3,4-butanetetracarboxylate, tetrakis(N-methyl-2,2,6,6-tetramethyl-4-piperidyl)1,2,3,4-butanetetracarboxylate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, or a piperidine derivative condensation product, for example, a dimethyl succinate-1-(2-hydroxyethyl)-4-hydroxy-2,2,6,6-tetramethylpiperidine polycondensation product, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] (molecular weight: 2500 or more), and poly[(6-morpholino-S-triazine-2,4-diyl)(2,2,6,6-tetramethyl-4-piperidyl)imino|hexamethylene|(2,2,6,6-tetramethyl-4-piperidyl)imino] (molecular weight: 1400 to 1700).

Preferred is the high-molecular hindered amine series substance having the molecular weight of 1000 or more and preferably used are poly[(6-morpholino-S-triazine-2,4-diyl)(2,2,6,6-tetramethyl-4-piperidyl)imino|hexamethylene|(2,2,6,6-tetramethyl-4-piperidyl)imino] (molecular weight: 1400 to 1700) and a dimethyl succinate-1-(2-hydroxyethyl)-4-hydroxy-2,2,6,6-tetramethylpiperidine polycondensation product (molecular weight: 3000 or more).

The addition amounts of the hindered amine series substances (D) used herein are suitably 0.01 to 1.0 part by weight (per 100 parts by weight of the polyacetal resin) for the low-molecular substance (D-1) having the molecular weight of less than 700 and 0.01 to 4.0 parts by weight for the high-molecular substance (D-2) having the molecular weight of 700 or more. The total amount of two kinds of the hindered amine series substances is suitably 0.02 to 5.0 parts by weight. In particular, preferred are 0.02 to 1 part by weight for (D-1) and 0.03 to 1.5 part by weight for (D-2). The ratio of (D-1) to (D-2) is preferably 1:1 to 1:5. In the case where these components are too little, an effect can not be expected and too large addition causes bleeding and results in damaging an initial mold surface condition which is the purpose of the present invention. In particular, too large addition of the low-molecular hindered amine series substance (D-1) not only increases bleeding and discolration and makes a surface notably inferior but also provides the problems such as reduction in a mechanical property and stain of a die (so-called mold deposit).

Two kinds of such hindered amine series substances (D) having the different molecular weights are used in combination with the UV absorber (C) to provide a sufficient effect for improving a weather resistance, particularly prevention of cracks on a molded product surface and prevention of discolration on the molded product surface caused by extended exposure.

Such action effect is considered as follows. First, the hindered amine series substance scavenges and stabilizes a radical generated on a molded product surface by influence of light and heat. Hindered amine on the surface is deactivated by extended irradiation of light but hindered amine scattered in the inside is bleeded on the surface by temperature change. While this leads to light stabilization, a molded product surface is discolored since as described above, a bleeding amount of the low-molecular substance having a high volatility is too much. Meanwhile, since the high-molecular substance having a low volatility has a too late bleeding rate, the molded product surface is deteriorated by light.

The evaluation on various bleeding amounts and discoloring levels results in considering that combined use of the hindered amine series compounds having the molecular weights of more or less than 700 with the molecular weight of 700 being a boundary suppresses discolration caused by bleeding and provides an excellent weather resistance against extended light exposure.

Next, the oxyalkylene polymer (E) used in the present invention has a carbon chain consisting of 2 to 8 carbon atoms adjacent to each other and the examples thereof include poly(ethylene oxide), poly(propylene oxide), poly(butylene-1,2-oxide), polyoxolane, polyoxane, polyoxepane, polyoxokane and polyoxonane and an ethylene oxide-propylene oxide copolymer, and an ethylene oxide-oxolane copolymer. Herein, the copolymer means a random copolymer, a block copolymer, a graft copolymer and the mixture thereof. The oxyalkylene polymer used has a molecular weight (number average) of 500 to 200,000, preferably 4,000 to 50,000. Among them, the oxyalkylene polymer having the carbon chain consisting of 2 to 4 carbon atoms adjacent to each other is preferred and there are included poly(ethylene oxide), polypropylene oxide), poly(butylene-1,2-oxide), polyoxolane and the ethylene oxide.propylene oxide copolymer. More preferred are poly(ethylene oxide), poly(propylene oxide) and the ethylene oxide.propylene oxide copolymer.

The addition amount of the oxyalkylene polymer (E) used herein is suitably 0.1 to 10 parts by weight, particularly preferably 0.3 to 5 parts by weight per 100 parts by weight of the polyacetal resin (A). The amount less than 0.1 part by weight provides a small effect of improving the weather (light) resistance and the amount more than 10 parts by weight saturates the improving effect to exert an adverse influence to an intrinsic characteristic of the polyacetal resin.

Such oxyalkylene polymer (E) provides a very excellent weather (light) resistance even when a molded product is left for standing under an extended irradiation of light and suppresses discolration and crack generation by using in combination with the core-shell polymer (B) and/or the UV absorber (C) and two kinds of the hindered amine series substances (D) having the different molecular weights, each described above. In addition thereto, discoloration on a surface of a molded product caused by bleeding of additives is controlled and an initial appearance of the molded product is maintained.

The coloring component (F) can further be blended with the composition (I) or (II) of the present invention to obtain a colored molded product which does not need a plating layer and a coating layer. Various carbon blacks and other various dyes and pigments are used as the coloring component.

Of them, addition of carbon black further improves a weather resistance of the composition.

A blending amount of the coloring component used herein is 0.1 to 4 parts by weight, preferably 0.2 to 2 parts by weight per 100 parts by weight of the polyacetal resin.

A colored molded product obtained by adding the coloring component (F) to the components (A), (C) and (D) can suppress light degradation and discolration and gloss reduction caused by bleeding of a stabilizer and maintain an initial color and gloss level under an environment of extended exposure to light.

Further, the coloring component (F) can be blended into the composition (III) of the present invention to provide a colored molded product which does not need a plating layer and a coating layer. Various dyes and pigments are used as the coloring component. For example, an anthraquinone series dye is preferred as the dye and in addition to a carbon black, preferred as the pigment are an azo series, a phthalocyanine series, a perylene series, a quinacridone series, an anthraquinone series, an indoline series, a titanium series, an iron oxide series and a cobalt series. These coloring components may be used singly or in combination of two or more kinds.

In particular, addition of the carbon black as the coloring component provides an effect for further improving a weather resistance stability. There can be used as the carbon black, those which are usually used for coloring plastics, for example, Micronex, Acetylene Black and Kötchen Black.

In the composition of the present invention, a blending amount of this coloring component falls preferably in a range of 0.1 to 10 parts by weight per 100 parts by weight of the polyacetal resin. In particular, 0.3 to 3 parts by weight is suitable. This blending amount less than 0.1 part by weight does not sufficiently reveal a coloring effect. The coloring component is not needed to be blended in an amount more than 10 parts by weight and the excessive blending amount rather reduces a physical property and a heat stability of the composition.

Further, publicly known various stabilizers are preferably added to the composition of the present invention to strengthen a heat stability and for this purpose, publicly known anti-oxidation agents, nitrogen-containing compounds, alkaline or alkaline earth metal compounds are preferably used in combination of one kind or two or more kinds. Further, in order to provide the composition of the present invention with the desired characteristics according to the purposes, there can be added and incorporated one kind or two or more kinds of the publicly known additives, for example, a sliding agent, a nucleus agent, a releasing agent, an anti-static agent, other surface active agents, an organic high molecular material, and inorganic or organic, fibrous, powdery or tabular fillers.

In general, the composition of the present invention can be prepared with the facilities and processes which are publicly known as a production process for a synthetic resin composition. That is, the needed components are mixed and kneaded with a single shaft or double shaft extruder and can be molded after extruding to make pellets for molding. Further, it is possible as well to prepare the composition simultaneously with molding with a molding machine. There is possible any one such as a process in which in order to improve dispersing and mixing of the respective components, a part or all of a resin component is pulverized and mixed to mold pellets by melting and extruding.

The blending substances such as the stabilizers and the additives each described above may be added at any arbitrary stage and can naturally be added and mixed immediately before obtaining a finished molded product.

The resin composition according to the present invention can be molded with any of extruding molding, injection molding, pressing molding, vacuum molding, blowing molding and foaming molding.

As apparent from the above explanations and the examples, the composition of the present invention prepared by blending the polyacetal resin with the UV absorber and two kinds of the hindered amine series compounds having the different molecular weights in combination showed a notable effect of markedly improving a weather resistance by controlling discoloration and gloss reduction caused by bleeding of the stabilizers to the utmost even under light exposing environment over a long period of time while maintaining an initial surface condition of a polyacetal molded product.

Accordingly, with respect to the applications of the composition of the present invention, it can be suitably used for the applications of automobile interior products (for example, a regulator handle, an interior clip and a ventilator knob), an outer handle for an automobile, a key top for a key board, optical machineries, housing and household products making the best use of the excellent weather (light) resistance and the characteristic of maintaining an initial surface condition.

[EFFECT OF THE INVENTION]

The composition of the present invention prepared by blending the polyacetal resin with the specific core-shell polymer, the UV absorber, two kinds of the hindered amine series substances and the specific oxyalkylene polymer showed the marked effects that while maintaining the balanced mechanical properties of polyacetal, it provides an excellent weather resistance and does not have bleeding and discolration particularly in exposing over a long period of time and that it provides very excellent maintenance of an initial appearance and markedly reduces gloss on a molded product surface.

Accordingly, the polyacetal resin composition of the present invention having a low glossiness can suitably be used for the automobile interior products which are required to have a weather (light) resistance as well as to give a high grade feeling and prevent reflection of light (for example, a regulator handle, an interior clip and a ventilator knob), an optical machinery, a building material and a household product.

EXAMPLES

The present invention will be explained below with reference to the examples but the present invention will not be limited thereto. "Part" used in the examples and the comparative examples represents part by weight. As follows are the methods used for evaluating a surface condition and the characteristic values of the mechanical properties in the examples.

(1) Surface condition:

The surface condition was classified to the ranks of 1 to 4 and a matting condition and a uniformity on a surface were evaluated. A smaller numeral shows a status that the matting condition and the uniformity are better.

1: When a fluorescent lamp is reflected on a sample, an outline of the fluorescent lamp is not observed and the surface is uniformly roughened.
2: While the outline of the fluorescent lamp is not observed, irregularities on the surface are uneven and roughened.
3: While the outline of the fluorescent lamp is observed, it is indistinct.
4: The outline of the fluorescent lamp is clearly observed and the irregularities on the surface are scarcely observed.

(2) Surface glossiness:

A test piece (70 mm×40 mm×30 mm thickness) which was molded at the following conditions was used to measure a glossiness at 45°-45° reflection with a digital deformation glossimeter (UGV-40 manufactured by Suga Tester Co., Ltd.) according to the glossiness measurement of JIS K7105.

The surfaces of the molded products which were molded with the dies having specular faces and crimps were measured for the gloss.

| Molding machine: | IS80 manufactured by Toshiba Co., Ltd. | | |
|---|---|---|---|
| Molding condition: | Nozzle | C1 | C2 | C3 |
| Cylinder temperature (°C.) | 200 | 190 | 180 | 160 |
| Injection pressure | 650 (kg/cm²) | | |
| Injection speed | 1.0 (m/min) | | |
| Die temperature | 80 (°C.) | | |

(3) Weather resistance test:

(1) A test was carried out at the following bright/dark cycle conditions with a xenon weather meter (model: XEL-2WN manufactured by Suga Tester Co., Ltd.):

Light irradiation: 3.8 hrs/89° C., 50% RH

Dark: 1.0 hr/38° C., 95% RH (2) Extended sun light exposure was carried out accordingn to an under-glass exposing (a complete sealing system) test in Okinawa.

Change in a surface condition and crack generating time were evaluated in the above test.

(a) Crack generating time:

A test piece was exposed at the prescribed conditions and the presence of crack generation on a test piece surface was observed with a loupe of 10 magnifications to determine the crack generating time with the time when crack was first observed. A larger value shows a better result.

(b) Changes-1 and 2 in a surface condition (confirmation of a bleeding status):

A test piece was exposed at the prescribed conditions for fixed time and change in a color tone, gloss change and a situation in a crack of the test piece before and after exposing were observed to classify the degrees of the changes to five grades. A smaller numeral means less change, that is, less discoloration and gloss change and less generation of cracks. Change in the surface condition was evaluated at two stages shown below:

1. The test piece after an exposing processing was observed and evaluated as it was.

2. In order to remove a discoloration factor attributable to bleeding, the test piece after the exposing processing was cleaned with a wet cloth and then was observed and evaluated.

That is, in the case where a point is high at the change-1 of the surface condition and the point is low at the change-2 of the surface condition, the discoloration factor attributable to bleeding is considered to be large, and in the case where the points are high at both of the change-1 and the change-2, deterioration attributable to a weather resistance is considered to be a primary factor.

(4) Tensile test:

A tensile strength was measured according to ASTM D638.

The abbreviations used in the examples and the comparative examples are as follows:

| | |
|---|---|
| Ethyl acrylate | EA |
| Methyl methacrylate | MMA |
| Butyl acrylate | BA |
| 1,4-Butylene glycol acrylate | BGA |
| Allyl methacrylate | AIMA |
| Methacrylamide | MAM |
| Nonionic surface active agent (Emulgen 950 manufactured by Kao Co., Ltd.) | E950 |
| Oligomer type anionic surface active agent (synthesized according to the description in Example 13 of JP-A-53-10682 and after adjusting to pH 7.5 with aqueous ammonia, a solid matter rate was adjusted to 10% with pure water) | Surface active agent A |

$$\text{n-dodecyl-S}\left(\begin{array}{cc}H & CH_3 \\ | & | \\ C-C \\ | & | \\ H & COOCH_3\end{array}\right)_a\left(\begin{array}{cc}H & CH_3 \\ | & | \\ C-C \\ | & | \\ H & COOH\end{array}\right)_b H$$

(in the formula, a:b = 7:3, a + b = about 13.6)

| Composition: | |
|---|---|
| Methacrylic acid | 155 g |
| MMA | 360 g |
| n-Dodecylmercaptan | 109 g |
| Azobisisobutyronitrile | 4.4 g |
| Isopropanol | 314 g |
| Molecular weight | 1310) |
| Deionized water | DIW |
| 2,2'-Azobis(2-amidinopropane)dihydrochloride (V50 manufactured by Wako Junyaku Co., Ltd.) | V50 |
| 2-Hydroxyethyl methacrylate | HEMA |
| Styrene | St |
| Glycidyl methacrylate | GMA |

Manufacturing Examples 1 to 3

(Manufacturing of the Core-Shell Polymers B-1 to 3)

DIW 1200 g, 25% aqueous ammonia 1.68 g, the surface active agent A 7 g and MAM 0.14 g were put in a 5 liter polymerization vessel equipped with a reflux condenser and a temperature was raised to 70° C. under nitrogen flow while stirring. After a seed monomer mixture of 27.86 g consisting of the following composition was added and dispersed over a period of 10 minutes, a 10% aqueous solution 21 g of V50 was added to polymerize to a seed grain.

| Seed monomer | |
|---|---|
| EA | 27.664g |
| AIMA | 0.14 g |
| BGA | 0.056g |

Subsequently, MAM 7 g was added and a monomer emulsion prepared by blending a core portion monomer mixture 1365 g consisting of the following composition with the surface active agent A 210 g, DIW 900 g and 25% aqueous ammonia 2.80 g and a mixing solution of a 10% V50 aqueous solution 21.0 g and 1% aqueous ammonia 0.63 g were continuously fed over a period of 180 minutes to carry out a seed polymerization.

| Core portion monomer mixture | |
|---|---|
| BA | 1215.2g |
| MMA | 140.0g |
| BGA | 2.8g |
| AIMA | 7.0g |

After raising a temperature to 80° C. and ripening for 1 hour, the solution was cooled down to 70° C.

Next, a 10% aqueous solution 9 g of V50 and 1% aqueous ammonia 0.27 g were added and a shell portion monomer emulsion having the following composition, the 10% aqueous solution 12 g of V50 and 1% aqueous ammonia 0.36 g were continuously fed over a period of 60 minutes to carry out the seed polymerization.

| Shell portion monomer mixture | |
|---|---|
| MMA | 265.8g |
| EA | 60.0g |
| Surface active agent A | 30.0g |
| DIW | 500.0g |

| Shell portion monomer mixture | |
|---|---|
| 25% aqueous ammonia | 0.72g |
| St | 180.0 g |
| HEMA | 90.0 g |
| BGA | 1.2 g |
| MAM | 3.0 g |

After raising a temperature to 80° C. and ripening for 1 hour, the solution was cooled down and then filtrated with a stainless wire net of 300 mesh to obtain a core-shell polymer latex.

After this latex was frozen at −15° C. and filtrated with a glass filter, it was dried at 60° C. by blowing for a whole day and night to obtain the core-shell polymer B-1.

The polymerization was carried out in the same manner as that in the manufacturing example 1, except that the monomers having the compositions shown in Table 1 were used, whereby the core-shell polymers B-2 and B-3 were obtained.

TABLE 1

| | Monomer composition | Core-shell polymer (mark) | |
|---|---|---|---|
| | (parts by weight) | B-2 | B-3 |
| Core portion | BA | 1243.2 | 1250.2 |
| | MMA | 140.0 | 140.0 |
| | BGA | 2.8 | 2.8 |
| | AIMA | 14.0 | 7.0 |
| Shell portion | MMA | 448.8 | 478.8 |
| | EA | 60.0 | 60.0 |
| | GMA | — | 60.0 |
| | HEMA | 90.0 | — |
| | BGA | 1.2 | 1.2 |

The core portion monomer mixture 35 g was used for the seed monomer.

Note-1)
C-1: 2-[2-hydroxy-3,5-bis (α,α-dimethylbenzyl)phenyl] benzotriazole
C-2: 2-hydroxy-4-oxybenzylbenzophenone Note-2) Low-molecular hindered amine compound
D-1: bis(2,2,6,6-tetramethyl-4-piperidyl)sebacate (molecular weight: 481)
D-2: bis(l-methyl-2,2,6,6-tetramethyl-4-piperidyl)adipate (molecular weight: 453)

Note-3) High-molecular hindered amine compound
D-3: poly[(6-morpholino-S-triazine-2,4-diyl)(2,2,6,6-tetramethyl-4-piperidyl)imino]hexamethylene-[(2,2,6,6-tetramethyl-4-piperidyl)imino] (molecular weight: about 1600)
D-4: dimethyl succinate-1-(2-hydroxyethyl)-4-hydroxy-2,2,6,6-tetramethylpiperidine polycondensation product (molecular weight: 3000 or more)
D-5: tetrakis(2,2,6,6-tetramethyl-4-piperidyl)1,2,3,4-butanetetracarboxylate (molecular weight: 792)

Note-4) Oxyalkylene polymer
E-1: poly(ethylene oxide) (average molecular weight: 4000)
E-2: poly(propylene oxide) (average molecular weight: 6000)

Note-5)
F-1: carbon black
F-2: quinacridone series red

Example 1

The core-shell polymer B-1 which was prepared in the above manner, various weather resistance stabilizers (C-1, D-1 and D-3) and the oxyalkylene polymer E-1 were blended with the polyacetal resin (A) (Duracon/brand name, manufactured by Polyplastics Co., Ltd.) in the composition shown in Table 2. After mixing with a Hönschel mixer, the mixture was melted and kneaded with a 30 mm double shaft extruder to prepare a pelletized composition. Then, a test piece was molded from this pellet with an injection molding machine at the molding conditions described above, and gloss and the other characteristics were measured and evaluated. The results thereof are shown in Table 2.

Comparative Example 1

The UV absorber and the low-molecular hindered amine series substance were blended with the polyacetal resin to obtain a polyacetal composition, and each test piece was prepared from this composition in the same manner as that in Example 1 and evaluated. The results thereof are shown in Table 3.

Examples 2 to 16

The core-shell polymers B-2 and 3 which were prepared in the manner described above were used to obtain the polyacetal compositions in the composition shown in Table 2 in the same manner as that in Example 1. Similarly, the respective test pieces were prepared from these compositions and evaluated. The results thereof are shown in Table 2.

Comparative Examples 2 to 28

As shown in Tables 3 and 4, 1 to 4 kinds were selected from five kinds of the core-shell polymer, the UV absorber, two kinds of the hindered amine series substances and the oxyalkylene polymer and blended with the polyacetal resin to prepare and evaluate the compositions in the same manners as those in Example 1.

The results thereof are shown in Tables 3 and 4.

TABLE 2

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (A) Polyacetal resin (parts by weight) | 100 | 100 | 100 | 100 | 100 | 100 | 100 | 100 | 100 | 100 | 100 | 100 | 100 | 100 | 100 | 100 |
| (B) Core-shell polymer | | | | | | | | | | | | | | | | |
| Kind | B-1 | B-2 | B-2 | B-2 | B-2 | B-2 | B-2 | B-2 | B-2 | B-2 | B-2 | B-2 | B-2 | B-3 | B-3 | B-2 |
| (parts by weight) | 10 | 5 | 10 | 10 | 10 | 10 | 10 | 10 | 10 | 10 | 10 | 20 | 30 | 10 | 20 | 10 |
| (C) UV absorber | | | | | | | | | | | | | | | | |
| Note-1 | C-1 | C-1 | C-1 | C-1 | C-1 | C-1 | C-1 | C-1 | C-1 | C-2 | C-1 | C-1 | C-1 | C-1 | C-1 | C-1 |
| (parts by weight) | 0.6 | 0.6 | 0.6 | 0.6 | 0.3 | 0.3 | 0.6 | 0.6 | 0.6 | 0.6 | 0.6 | 0.6 | 0.6 | 0.6 | 0.6 | 0.6 |
| (D) Hindered amine compound | | | | | | | | | | | | | | | | |
| Note-2 | D-1 | D-1 | D-1 | D-1 | D-1 | D-1 | D-1 | D-2 | D-1 | D-1 | D-1 | D-1 | D-1 | D-1 | D-1 | D-1 |
| (parts by weight) | 0.3 | 0.3 | 0.3 | 0.3 | 0.3 | 0.3 | 0.3 | 0.3 | 0.2 | 0.3 | 0.3 | 0.3 | 0.3 | 0.3 | 0.3 | 0.3 |
| Note-3 | D-3 | D-3 | D-3 | D-3 | D-3 | D-5 | D-4 | D-3 | D-3 | D-3 | D-3 | D-3 | D-3 | D-3 | D-3 | D-3 |
| (parts by weight) | 0.3 | 0.3 | 0.3 | 0.3 | 0.3 | 0.3 | 0.3 | 0.3 | 0.6 | 0.3 | 0.3 | 0.3 | 0.3 | 0.3 | 0.3 | 0.3 |
| (E) Oxyalkylene polymer | | | | | | | | | | | | | | | | |
| Note-4 | E-1 | E-1 | E-1 | E-1 | E-1 | E-1 | E-1 | E-1 | E-1 | E-1 | E-2 | E-1 | E-1 | E-1 | E-1 | E-1 |
| (parts by weight) | 0.5 | 0.5 | 0.5 | 1.0 | 1.0 | 1.0 | 1.0 | 1.0 | 1.0 | 1.0 | 1.0 | 1.0 | 2.0 | 2.0 | 2.0 | 1.0 |
| (F) Colorant | | | | | | | | | | | | | | | | |
| Note-5 | | | | | | | | | | | | | | | | F-1 |
| (parts by weight) | | | | | | | | | | | | | | | | 0.5 |
| Surface condition | 1 | 2 | 1 | 1 | 1 | 1 | 1 | 1 | 1 | 1 | 1 | 1 | 1 | 1 | 1 | 1 |
| Glossiness (%) (45°–45°) | | | | | | | | | | | | | | | | |
| Specular | 14 | 20 | 13 | 14 | 14 | 14 | 14 | 14 | 13 | 14 | 15 | 9.0 | 6.0 | 16 | 10 | 14 |
| Crimp | 3.8 | 4.0 | 3.4 | 3.5 | 3.5 | 3.4 | 3.5 | 3.5 | 3.4 | 3.5 | 3.6 | 2.9 | 2.1 | 3.7 | 3.1 | 3.4 |
| Weather resistance test 1 | | | | | | | | | | | | | | | | |
| Crack generating time (Hrs) | 720 | 840 | 900 | 960 | 900 | 900 | 900 | 840 | 960 | 900 | 840 | 1140 | 1320 | 960 | 1140 | 1200 |
| Surface condition 1 | | | | | | | | | | | | | | | | |
| 500 hr irradiation | 1 | 1 | 1 | 1 | 1 | 1 | 1 | 1 | 1 | 1 | 1 | 1 | 1 | 1 | 1 | 1 |
| 1000 hr irradiation | 2 | 2 | 1 | 1 | 1 | 1 | 1 | 2 | 1 | 1 | 2 | 1 | 1 | 1 | 1 | 1 |
| Surface condition 2 | | | | | | | | | | | | | | | | |
| 500 hr irradiation | 1 | 1 | 1 | 1 | 1 | 1 | 1 | 1 | 1 | 1 | 1 | 1 | 1 | 1 | 1 | 1 |
| 1000 hr irradiation | 2 | 2 | 1 | 1 | 1 | 1 | 1 | 2 | 1 | 1 | 2 | 1 | 1 | 1 | 1 | 1 |
| Weather resistance test 2 | | | | | | | | | | | | | | | | |
| Crack generating time (month) | 11 | 11 | 12> | 12> | 12 | 12 | 12 | 11 | 12> | 12 | 11 | 12> | 12> | 12> | 12> | 12> |
| Surface condition 1 | | | | | | | | | | | | | | | | |
| 3 month irradiation | 1 | 1 | 1 | 1 | 1 | 1 | 1 | 1 | 1 | 1 | 1 | 1 | 1 | 1 | 1 | 1 |
| 6 month irradiation | 1 | 1 | 1 | 1 | 1 | 2 | 1 | 1 | 1 | 1 | 1 | 1 | 1 | 1 | 1 | 1 |

TABLE 2-continued

| | Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Surface condition 2 | | | | | | | | | | | | | | | | |
| 3 month irradiation | 1 | 1 | 1 | 1 | 1 | 1 | 1 | 1 | 1 | 1 | 1 | 1 | 1 | 1 | 1 | 1 |
| 6 month irradiation | 1 | 1 | 1 | 1 | 1 | 1 | 1 | 1 | 1 | 1 | 1 | 1 | 1 | 1 | 1 | 1 |
| Tensile test | | | | | | | | | | | | | | | | |
| Yield strength (kg/cm$^2$) | 95 | 80 | 98 | 104 | 109 | 107 | 103 | 106 | 99 | 103 | 98 | 107 | 118 | 92 | 98 | 92 |
| Elongation (%) | 488 | 526 | 484 | 479 | 485 | 482 | 480 | 479 | 483 | 480 | 483 | 478 | 467 | 500 | 485 | 491 |

TABLE 3

| | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (A) Polyacetal resin (parts by weight) | 100 | 100 | 100 | 100 | 100 | 100 | 100 | 100 | 100 | 100 | 100 | 100 | 100 | 100 |
| (B) Core-shell polymer | | | | | | | | | | | | | | |
| Kind | | | | B-1 | B-1 | B-2 | B-2 | B-2 | B-2 | B-2 | B-2 | B-2 | B-2 | B-2 |
| (parts by weight) | | | | 10 | 10 | 5 | 5 | 10 | 10 | 10 | 10 | 10 | 10 | 10 |
| (C) UV absorber | | | | | | | | | | | | | | |
| Note-1 | C-1 | C-1 | C-1 | C-1 | C-1 | C-1 | C-1 | C-1 | C-1 | C-1 | C-1 | C-1 | C-1 | C-1 |
| (parts by weight) | 0.6 | 0.6 | 0.6 | 0.6 | 0.6 | 0.6 | 0.6 | 0.6 | 0.6 | 0.6 | 0.3 | 0.3 | 0.3 | 0.6 |
| (D) Hindered amine compound | | | | | | | | | | | | | | |
| Note-2 | D-1 | D-1 | | D-1 | | D-1 | | D-1 | D-1 | D-1 | | | | |
| (parts by weight) | 0.3 | 0.3 | | 0.3 | | 0.3 | | 0.3 | 0.3 | 0.3 | | | | |
| Note-3 | | | D-3 | | D-3 | | D-3 | | | D-3 | | D-3 | D-5 | D-4 |
| (parts by weight) | | | 0.3 | | 0.3 | | 0.3 | | | 0.3 | | 0.3 | 0.3 | 0.3 |
| (E) Oxyalkylene polymer | | | | | | | | | | | | | | |
| Note-4 | | E-1 | E-1 | | E-1 | | | | | E-1 | | | | |
| (parts by weight) | | 0.5 | 0.5 | | 0.5 | | | | | 1.0 | | | | |
| (F) Colorant | | | | | | | | | | | | | | |
| Note-5 | | | | | | | | | | | | | | |
| (parts by weight) | | | | | | | | | | | | | | |
| Surface condition | 5 | 5 | 5 | 1 | 1 | 2 | 2 | 1 | 1 | 1 | 1 | 1 | 1 | 1 |
| Glossiness (%) (45°–45°) | | | | | | | | | | | | | | |
| Specular | 75 | 73 | 75 | 14 | 14 | 20 | 19 | 13 | 14 | 14 | 14 | 15 | 14 | 14 |
| Crimp | 8.0 | 7.8 | 7.9 | 3.7 | 3.6 | 4.1 | 4.0 | 3.6 | 3.7 | 3.7 | 3.6 | 3.7 | 3.6 | 3.7 |
| Weather resistance test 1 | | | | | | | | | | | | | | |
| Crack generating time (Hrs) | 480 | 540 | 480 | 600 | 540 | 660 | 600 | 720 | 660 | 780 | 660 | 600 | 660 | 600 |
| Surface condition 1 | | | | | | | | | | | | | | |
| 500 hr irradiation | 3 | 3 | 3 | 2 | 3 | 1 | 2 | 1 | 2 | 1 | 1 | 2 | 2 | 2 |
| 1000 hr irradiation | 5 | 5 | 5 | 4 | 5 | 4 | 5 | 4 | 4 | 4 | 4 | 4 | 4 | 4 |
| Surface condition 2 | | | | | | | | | | | | | | |
| 500 hr irradiation | 3 | 3 | 3 | 2 | 3 | 1 | 2 | 1 | 2 | 1 | 1 | 2 | 2 | 2 |
| 1000 hr irradiation | 5 | 5 | 5 | 3 | 5 | 3 | 5 | 2 | 4 | 2 | 3 | 4 | 4 | 4 |
| Weather resistance test 2 | | | | | | | | | | | | | | |
| Crack generating time (month) | 6 | 7 | 6 | 9 | 8 | 8 | 7 | 9 | 7 | 10 | 8 | 7 | 8 | 6 |
| Surface condition 1 | | | | | | | | | | | | | | |
| 3 month irradiation | 2 | 2 | 2 | 2 | 1 | 1 | 1 | 1 | 1 | 1 | 1 | 2 | 1 | 2 |
| 6 month irradiation | 4 | 4 | 3 | 3 | 3 | 3 | 3 | 3 | 3 | 3 | 3 | 4 | 3 | 4 |
| Surface condition 2 | | | | | | | | | | | | | | |
| 3 month irradiation | 2 | 2 | 2 | 1 | 1 | 1 | 1 | 1 | 1 | 1 | 1 | 2 | 1 | 2 |
| 6 month irradiation | 4 | 3 | 3 | 2 | 3 | 2 | 3 | 2 | 3 | 2 | 2 | 4 | 3 | 4 |
| Tensile test | | | | | | | | | | | | | | |
| Yield strength (kg/cm$^2$) | 65 | 71 | 69 | 87 | 92 | 81 | 79 | 86 | 88 | 98 | 85 | 83 | 81 | 90 |
| Elongation (%) | 615 | 604 | 608 | 506 | 494 | 533 | 538 | 501 | 504 | 496 | 520 | 525 | 521 | 503 |

TABLE 4

|  | Comparative Examples | | | | | | | | | | | | | |
| --- | --- | --- | --- | --- | --- | --- | --- | --- | --- | --- | --- | --- | --- | --- |
|  | 15 | 16 | 17 | 18 | 19 | 20 | 21 | 22 | 23 | 24 | 25 | 26 | 27 | 28 |
| (A) Polyacetal resin (parts by weight) | 100 | 100 | 100 | 100 | 100 | 100 | 100 | 100 | 100 | 100 | 100 | 100 | 100 | 100 |
| (B) Core-shell polymer | | | | | | | | | | | | | | |
| Kind | B-2 |  | B-2 | B-2 | B-2 | B-2 | B-2 |  | B-2 | B-2 | B-3 | B-3 | B-2 | B-2 |
| (parts by weight) | 10 |  | 10 | 10 | 10 | 20 | 20 |  | 30 | 30 | 10 | 20 | 10 | 10 |
| (C) UV absorber | | | | | | | | | | | | | | |
| Note-1 | C-1 | C-1 | C-1 | C-2 | C-2 | C-1 | C-1 | C-1 | C-1 | C-1 | C-1 | C-1 | C-1 | C-1 |
| (parts by weight) | 0.6 | 0.6 | 0.6 | 0.6 | 0.6 | 0.6 | 0.6 | 0.6 | 0.6 | 0.6 | 0.6 | 0.6 | 0.6 | 0.6 |
| (D) Hindered amine compound | | | | | | | | | | | | | | |
| Note-2 | D-2 |  |  | D-1 |  | D-1 |  | D-1 | D-1 |  | D-1 |  | D-1 |  |
| (parts by weight) | 0.3 |  |  | 0.3 |  | 0.3 |  | 0.3 | 0.3 |  | 0.3 |  | 0.3 |  |
| Note-3 |  | D-3 | D-3 |  | D-3 |  | D-3 |  |  | D-3 |  | D-3 |  | D-3 |
| (parts by weight) |  | 0.6 | 0.6 |  | 0.3 |  | 0.3 |  |  | 0.3 |  | 0.3 |  | 0.3 |
| (E) Oxyalkylene polymer | | | | | | | | | | | | | | |
| Note-4 |  |  |  |  |  |  |  | E-1 |  |  |  |  |  |  |
| (parts by weight) |  |  |  |  |  |  |  | 2.0 |  |  |  |  |  |  |
| (F) Colorant | | | | | | | | | | | | | | |
| Note-5 |  |  |  |  |  |  |  |  |  |  |  |  | F-1 | F-1 |
| (parts by weight) |  |  |  |  |  |  |  |  |  |  |  |  | 0.5 | 0.5 |
| Surface condition | 1 | 5 | 1 | 1 | 1 | 1 | 1 | 5 | 1 | 1 | 1 | 1 | 1 | 1 |
| Glossiness (%) (45°–45°) | | | | | | | | | | | | | | |
| Specular | 14 | 76 | 13 | 13 | 14 | 9.1 | 9.0 | 76 | 6.0 | 6.1 | 16 | 10 | 14 | 14 |
| Crimp | 3.7 | 8.0 | 3.6 | 3.6 | 3.7 | 3.0 | 2.9 | 8.0 | 2.1 | 2.1 | 3.7 | 3.1 | 3.4 | 3.5 |
| Weather resistance test 1 | | | | | | | | | | | | | | |
| Crack generating time (Hrs) | 660 | 360 | 540 | 600 | 540 | 840 | 780 | 600 | 960 | 900 | 780 | 840 | 960 | 900 |
| Surface condition 1 | | | | | | | | | | | | | | |
| 500 hr irradiation | 2 | 5 | 3 | 2 | 2 | 1 | 1 | 2 | 1 | 1 | 1 | 1 | 1 | 1 |
| 1000 hr irradiation | 4 | 5 | 5 | 4 | 4 | 3 | 3 | 4 | 2 | 2 | 4 | 2 | 2 | 2 |
| Surface condition 2 | | | | | | | | | | | | | | |
| 500 hr irradiation | 2 | 5 | 3 | 2 | 2 | 1 | 1 | 2 | 1 | 1 | 1 | 1 | 1 | 1 |
| 1000 hr irradiation | 3 | 5 | 5 | 3 | 4 | 2 | 3 | 4 | 1 | 2 | 2 | 2 | 1 | 2 |
| Weather resistance test 2 | | | | | | | | | | | | | | |
| Crack generating time (month) | 8 | 4 | 7 | 6 | 6 | 11 | 9 | 9 | 11 | 10 | 10 | 10 | 11 | 11 |
| Surface condition 1 | | | | | | | | | | | | | | |
| 3 month irradiation | 1 | 3 | 2 | 2 | 2 | 1 | 1 | 2 | 1 | 1 | 1 | 1 | 1 |  |
| 6 month irradiation | 1 | 5 | 4 | 4 | 4 | 3 | 2 | 3 | 2 | 2 | 3 | 2 | 2 | 1 |
| Surface condition 2 | | | | | | | | | | | | | | |
| 3 month irradiation | 1 | 3 | 2 | 2 | 2 | 1 | 1 | 1 | 1 | 1 | 1 | 1 | 1 | 1 |
| 6 month irradiation | 3 | 5 | 4 | 3 | 4 | 1 | 2 | 2 | 1 | 2 | 2 | 2 | 1 | 1 |
| Tensile test | | | | | | | | | | | | | | |
| Yield strength (kg/cm$^2$) | 92 | 61 | 77 | 90 | 88 | 100 | 99 | 899 | 106 | 104 | 90 | 95 | 81 | 74 |
| Elongation (%) | 499 | 622 | 506 | 502 | 505 | 490 | 493 | 553 | 477 | 479 | 501 | 492 | 516 | 545 |

Examples 31 to 43 and Comparative Examples 31 to 47

As shown in Table 5, the UV absorber (C), two kinds of the hindered amine series compounds (D) and the oxyalkylene polymer (E) were blended into the polyacetal resin (A) (brand name "Duracon" manufactured by Polyplastics Co., Ltd.) and then melted and kneaded with a 30 mm double shaft extruder to prepare a pelletized composition. Then, a test piece was molded from this pellet with an injection molding machine, and a weather resistance and the other characteristics were measured and evaluated. Further, as shown in Table 6, one compound of the components (C) to (E) was removed to similarly prepare and evaluate the compositions for the sake of comparison. The results thereof are shown in Tables 5 and 6.

TABLE 5

| | Examples | | | | | | | | | | | | |
|---|---|---|---|---|---|---|---|---|---|---|---|---|---|
| | 31 | 32 | 33 | 34 | 35 | 36 | 37 | 38 | 39 | 40 | 41 | 42 | 43 |
| (A) Polyacetal resin (parts by weight) | 100 | 100 | 100 | 100 | 100 | 100 | 100 | 100 | 100 | 100 | 100 | 100 | 100 |
| (C) UV absorber | | | | | | | | | | | | | |
| Note-1 | C-1 | C-1 | C-1 | C-2 | C-1 | C-1 | C-1 | C-1 | C-1 | C-2 | C-1 | C-1 | C-1 |
| (parts by weight) | 0.3 | 0.3 | 0.3 | 0.3 | 0.3 | 0.6 | 0.6 | 0.3 | 0.3 | 0.3 | 0.3 | 0.3 | 0.3 |
| (D) Hindered amine compound | | | | | | | | | | | | | |
| Note-2 | D-1 | D-1 | D-1 | D-1 | D-1 | D-1 | D-1 | D-2 | D-1 | D-1 | D-1 | D-1 | D-1 |
| (parts by weight) | 0.3 | 0.5 | 0.2 | 0.2 | 0.2 | 0.2 | 0.2 | 0.3 | 0.3 | 0.3 | 0.3 | 0.2 | 0.2 |
| Note-3 | D-3 | D-3 | D-3 | D-3 | D-3 | D-3 | D-3 | D-4 | D-5 | D-3 | D-3 | D-3 | D-3 |
| (parts by weight) | 0.3 | 0.2 | 0.5 | 0.5 | 0.5 | 0.5 | 0.8 | 0.3 | 0.3 | 0.3 | 0.3 | 0.5 | 0.5 |
| (E) Oxyalkylene polymer | | | | | | | | | | | | | |
| Note-4 | E-1 | E-1 | E-1 | E-1 | E-1 | E-1 | E-1 | E-1 | ε-1 | E-1 | E-2 | E-1 | E-1 |
| (parts by weight) | 1 | 1 | 1 | 0.5 | 3 | 1 | 1 | 1 | 1 | 1 | 1 | 1 | 1 |
| (F) Colorant | | | | | | | | | | | | | |
| Note-5 | | | | | | | | | | | | F-1 | F-2 |
| (parts by weight) | | | | | | | | | | | | 0.5 | 0.5 |
| Weather resistance test 1 | | | | | | | | | | | | | |
| Crack generating time (Hrs) | 700 | 860 | 750 | 710 | 820 | 790 | 920 | 680 | 720 | 680 | 660 | 800 | 760 |
| Surface condition 1 | | | | | | | | | | | | | |
| 500 hr irradiation | 1 | 1 | 1 | 1 | 1 | 1 | 1 | 1 | 1 | 1 | 1 | 1 | 1 |
| 1000 hr irradiation | 2 | 2 | 1 | 2 | 1 | 1 | 1 | 3 | 3 | 3 | 3 | 1 | 1 |
| Surface condition 2 | | | | | | | | | | | | | |
| 500 hr irradiation | 1 | 1 | 1 | 1 | 1 | 1 | 1 | 1 | 1 | 1 | 1 | 1 | 1 |
| 1000 hr irradiation | 2 | 1 | 1 | 1 | 1 | 1 | 1 | 3 | 2 | 3 | 3 | 1 | 1 |
| Weather resistance test 2 | | | | | | | | | | | | | |
| Crack generating time (month) | 8 | 9 | 8 | 7 | 10 | 9 | 10 | 7 | 8 | 7 | 7 | 9 | 8 |
| Surface condition 1 | | | | | | | | | | | | | |
| 3 month irradiation | 1 | 2 | 1 | 1 | 1 | 1 | 1 | 1 | 1 | 1 | 1 | 1 | 1 |
| 6 month irradiation | 2 | 3 | 1 | 1 | 1 | 1 | 1 | 2 | 3 | 2 | 2 | 1 | 1 |
| Surface condition 2 | | | | | | | | | | | | | |
| 3 month irradiation | 1 | 1 | 1 | 1 | 1 | 1 | 1 | 1 | 1 | 1 | 1 | 1 | 1 |
| 6 month irradiation | 2 | 1 | 1 | 1 | 1 | 1 | 1 | 2 | 2 | 2 | 2 | 1 | 1 |

TABLE 6

| | Comparative Examples | | | | | | | | | | | | | | | | |
|---|---|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 | 46 | 47 |
| (A) Polyacetal resin (parts by weight) | 100 | 100 | 100 | 100 | 100 | 100 | 100 | 100 | 100 | 100 | 100 | 100 | 100 | 100 | 100 | 100 | 100 |
| (C) UV absorber | | | | | | | | | | | | | | | | | |
| Note-1 | C-1 | C-1 | C-1 | | C-1 | C-1 | C-1 | C-1 | C-1 | C-1 | C-1 | C-1 | C-1 | C-2 | C-2 | C-1 | C-1 |
| (parts by weight) | 0.3 | 0.3 | 0.3 | | 0.3 | 0.3 | 0.3 | 0.3 | 0.6 | 0.6 | 0.3 | 0.3 | 0.3 | 0.3 | 0.3 | 0.3 | 0.3 |
| (D) Hindered amine compound | | | | | | | | | | | | | | | | | |
| Note-2 | D-1 | D-1 | | D-1 | D-1 | | | | D-1 | | D-2 | | | D-1 | | D-1 | |
| (parts by weight) | 0.3 | 0.3 | | 0.3 | 0.5 | | | | 0.2 | | 0.3 | | | 0.3 | | 0.2 | |
| Note-3 | D-3 | | D-3 | D-3 | | D-3 | D-3 | D-3 | | D-3 | | D-4 | D-5 | | D-3 | | D-3 |
| (parts by weight) | 0.3 | | 0.3 | 0.3 | | 0.5 | 0.5 | 0.5 | | 0.8 | | 0.3 | 0.3 | | 0.5 | | 0.5 |
| (E) Oxyalkylene polymer | | | | | | | | | | | | | | | | | |
| Note-4 | | E-1 | E-1 | E-1 | E-1 | ε-1 | E-1 | E-1 | E-1 | E-1 | E-1 | ε-1 | ε-1 | E-1 | E-1 | ε-1 | ε-1 |
| (parts by weight) | | 1 | 1 | 1 | 1 | 1 | 0.5 | 3 | 1 | 1 | 1 | 1 | 1 | 1 | 1 | 1 | 1 |
| (F) Colorant | | | | | | | | | | | | | | | | | |
| Note-5 | | | | | | | | | | | | | | | | F-1 | F-2 |
| (parts by weight) | | | | | | | | | | | | | | | | 0.5 | 0.5 |

TABLE 6-continued

|  | Comparative Examples | | | | | | | | | | | | | | | | |
|---|---|---|---|---|---|---|---|---|---|---|---|---|---|---|---|---|---|
|  | 31 | 32 | 33 | 34 | 35 | 36 | 37 | 38 | 39 | 40 | 41 | 42 | 43 | 44 | 45 | 46 | 47 |
| Weather resistance test 1 | | | | | | | | | | | | | | | | | |
| Crack generating time (hrs) | 600 | 600 | 480 | 600 | 660 | 520 | 420 | 580 | 630 | 780 | 580 | 420 | 500 | 600 | 440 | 660 | 540 |
| Surface condition 1 | | | | | | | | | | | | | | | | | |
| 500 hr irradiation | 1 | 2 | 3 | 3 | 4 | 3 | 3 | 2 | 2 | 1 | 2 | 3 | 3 | 2 | 3 | 3 | 3 |
| 1000 hr irradiation | 3 | 4 | 5 | 5 | 5 | 5 | 5 | 4 | 4 | 3 | 4 | 5 | 5 | 4 | 5 | 4 | 5 |
| Surface condition 2 | | | | | | | | | | | | | | | | | |
| 500 hr irradiation | 1 | 2 | 3 | 3 | 1 | 3 | 3 | 2 | 2 | 1 | 2 | 3 | 3 | 2 | 3 | 2 | 3 |
| 1000 hr irradiation | 3 | 3 | 5 | 5 | 2 | 5 | 5 | 4 | 4 | 3 | 3 | 5 | 5 | 3 | 5 | 3 | 5 |
| Weather resistance test 2 | | | | | | | | | | | | | | | | | |
| Crack generating time (month) | 6 | 6 | 5 | 6 | 7 | 5 | 4 | 6 | 6 | 8 | 6 | 4 | 6 | 6 | 5 | 7 | 5 |
| Surface condition 1 | | | | | | | | | | | | | | | | | |
| 3 month irradiation | 1 | 2 | 2 | 2 | 2 | 2 | 2 | 2 | 2 | 1 | 2 | 2 | 3 | 2 | 2 | 2 | 2 |
| 6 month irradiation | 2 | 3 | 3 | 3 | 4 | 3 | 3 | 3 | 4 | 2 | 3 | 3 | 4 | 3 | 3 | 4 | 3 |
| Surface condition 2 | | | | | | | | | | | | | | | | | |
| 3 month irradiation | 1 | 2 | 2 | 2 | 1 | 2 | 2 | 2 | 2 | 1 | 2 | 2 | 3 | 2 | 2 | 1 | 2 |
| 6 month irradiation | 2 | 3 | 3 | 3 | 2 | 3 | 3 | 3 | 3 | 2 | 3 | 3 | 4 | 3 | 3 | 3 | 3 |

Examples 51 to 63 and Comparative Examples 51 to 64

As shown in Table 7, the UV absorber (C) and two kinds of the hindered amine series compounds (D) were blended into the polyacetal resin (A) (brand name "Duracon" manufactured by Polyplastics Co., Ltd.) and then melted and kneaded with a 30 mm double shaft extruder to prepare a pelletized composition. Then, a test piece was molded from this pellet with an injection molding machine, and a weather resistance and the other characteristics were measured and evaluated. Further, as shown in Table 8, one compound of the component (C) and the components (D) was removed to similarly prepare and evaluate the compositions for the sake of comparison. The results thereof are shown in Tables 7 and 8.

TABLE 7

|  | Examples | | | | | | | | | | | | |
|---|---|---|---|---|---|---|---|---|---|---|---|---|---|
|  | 51 | 52 | 53 | 54 | 55 | 56 | 57 | 58 | 59 | 60 | 61 | 62 | 63 |
| (A) Polyacetal resin (parts by weight) | 100 | 100 | 100 | 100 | 100 | 100 | 100 | 100 | 100 | 100 | 100 | 100 | 100 |
| (C) UV absorber | | | | | | | | | | | | | |
| Note-1 | C-1 | C-1 | C-1 | C-1 | C-1 | C-1 | C-1 | C-1 | C-1 | C-2 | C-2 | C-1 | C-1 |
| (parts by weight) | 0.3 | 0.3 | 0.3 | 0.6 | 0.6 | 0.3 | 0.3 | 0.3 | 0.3 | 0.3 | 0.6 | 0.3 | 0.3 |
| (D) Hindered amine compound | | | | | | | | | | | | | |
| Note-2 | D-1 | D-1 | D-1 | D-1 | D-1 | D-2 | D-2 | D-2 | D-1 | D-1 | D-1 | D-1 | D-1 |
| (parts by weight) | 0.3 | 0.2 | 0.5 | 0.2 | 0.2 | 0.3 | 0.3 | 0.2 | 0.3 | 0.3 | 0.2 | 0.2 | 0.3 |
| Note-3 | D-3 | D-3 | D-3 | D-3 | D-3 | D-3 | D-4 | D-4 | D-5 | D-3 | D-3 | D-3 | D-3 |
| (parts by weight) | 0.3 | 0.5 | 0.2 | 0.5 | 0.8 | 0.3 | 0.3 | 0.5 | 0.3 | 0.3 | 0.5 | 0.5 | 0.5 |
| (F) Colorant | | | | | | | | | | | | | |
| Note-5 | | | | | | | | | | | | F-1 | F-2 |
| (parts by weight) | | | | | | | | | | | | 0.5 | 0.5 |
| Weather resistance test 1 | | | | | | | | | | | | | |
| Crack generating time (Hrs) | 600 | 660 | 780 | 720 | 840 | 600 | 600 | 600 | 620 | 600 | 660 | 780 | 660 |
| Surface condition 1 | | | | | | | | | | | | | |
| 500 hr irradiation | 1 | 1 | 1 | 1 | 1 | 1 | 1 | 1 | 1 | 1 | 1 | 1 | 1 |
| 1000 hr irradiation | 3 | 2 | 3 | 1 | 1 | 3 | 3 | 2 | 4 | 3 | 2 | 1 | 1 |
| Surface condition 2 | | | | | | | | | | | | | |
| 500 hr irradiation | 1 | 1 | 1 | 1 | 1 | 1 | 1 | 1 | 1 | 1 | 1 | 1 | 1 |
| 1000 hr irradiation | 3 | 2 | 2 | 1 | 1 | 3 | 3 | 2 | 3 | 3 | 2 | 1 | 1 |
| Weather resistance test 2 | | | | | | | | | | | | | |
| Crack generating time (month) | 6 | 6 | 8 | 7 | 9 | 6 | 6 | 6 | 6 | 6 | 6 | 9 | 6 |

TABLE 7-continued

| | Examples | | | | | | | | | | | | |
|---|---|---|---|---|---|---|---|---|---|---|---|---|---|
| | 51 | 52 | 53 | 54 | 55 | 56 | 57 | 58 | 59 | 60 | 61 | 62 | 63 |
| Surface condition 1 | | | | | | | | | | | | | |
| 3 month irradiation | 1 | 1 | 1 | 1 | 1 | 1 | 1 | 1 | 1 | 1 | 1 | 1 | 1 |
| 6 month irradiation | 2 | 1 | 3 | 1 | 1 | 2 | 2 | 1 | 3 | 2 | 2 | 1 | 1 |
| Surface condition 2 | | | | | | | | | | | | | |
| 3 month irradiation | 1 | 1 | 1 | 1 | 1 | 1 | 1 | 1 | 1 | 1 | 1 | 1 | 1 |
| 6 month irradiation | 2 | 1 | 1 | 1 | 1 | 2 | 2 | 2 | 2 | 2 | 2 | 1 | 1 |

TABLE 8

| | Comparative Examples | | | | | | | | | | | | | |
|---|---|---|---|---|---|---|---|---|---|---|---|---|---|---|
| | 51 | 52 | 53 | 54 | 55 | 56 | 57 | 58 | 59 | 60 | 61 | 62 | 63 | 64 |
| (A) Polyacetal resin (parts by weight) | 100 | 100 | 100 | 100 | 100 | 100 | 100 | 100 | 100 | 100 | 100 | 100 | 100 | 100 |
| (C) UV absorber | | | | | | | | | | | | | | |
| Note-1 | C-1 | C-1 | | C-1 | C-1 | C-1 | C-1 | C-1 | C-1 | C-2 | C-2 | C-2 | C-1 | C-1 |
| (parts by weight) | 0.3 | 0.3 | | 0.3 | 0.3 | 0.6 | 0.6 | 0.3 | 0.3 | 0.3 | 0.3 | 0.6 | 0.3 | 0.3 |
| (D) Hindered amine compound | | | | | | | | | | | | | | |
| Note-2 | D-1 | | D-1 | | D-1 | D-1 | | D-2 | | | D-1 | | D-1 | |
| (parts by weight) | 0.3 | | 0.3 | | 0.5 | 0.2 | | 0.3 | | | 0.3 | | 0.2 | |
| Note-3 | | D-3 | D-3 | D-3 | | | D-3 | | D-4 | D-5 | | D-3 | | D-3 |
| (parts by weight) | | 0.3 | 0.3 | 0.5 | | | 0.8 | | 0.3 | 0.3 | | 0.5 | | 0.5 |
| (F) Colorant | | | | | | | | | | | | | | |
| Note-5 | | | | | | | | | | | | | F-1 | F-1 |
| (parts by weight) | | | | | | | | | | | | | 0.5 | 0.5 |
| Weather resistance test 1 | | | | | | | | | | | | | | |
| Crack generating time (Hrs) | 540 | 420 | 540 | 460 | 600 | 580 | 720 | 540 | 420 | 460 | 540 | 460 | 700 | 640 |
| Surface condition 1 | | | | | | | | | | | | | | |
| 500 hr irradiation | 2 | 3 | 3 | 3 | 3 | 2 | 1 | 2 | 3 | 3 | 2 | 3 | 2 | 2 |
| 1000 hr irradiation | 4 | 5 | 5 | 5 | 5 | 4 | 3 | 4 | 5 | 5 | 4 | 5 | 4 | 3 |
| Surface condition 2 | | | | | | | | | | | | | | |
| 500 hr irradiation | 2 | 3 | 3 | 3 | 1 | 2 | 1 | 2 | 3 | 3 | 2 | 3 | 2 | 2 |
| 1000 hr irradiation | 3 | 5 | 5 | 5 | 3 | 3 | 3 | 3 | 5 | 5 | 3 | 5 | 3 | 3 |
| Weather resistance test 2 | | | | | | | | | | | | | | |
| Crack generating time (month) | 5 | 4 | 5 | 4 | 6 | 5 | 7 | 5 | 4 | 5 | 5 | 4 | 6 | 6 |
| Surface condition 1 | | | | | | | | | | | | | | |
| 3 month irradiation | 2 | 2 | 2 | 2 | 4 | 2 | 1 | 2 | 2 | 3 | 2 | 2 | 2 | 1 |
| 6 month irradiation | 4 | 3 | 3 | 3 | 5 | 4 | 2 | 4 | 3 | 4 | 4 | 3 | 4 | 2 |
| Surface condition 2 | | | | | | | | | | | | | | |
| 3 month irradiation | 2 | 2 | 2 | 2 | 1 | 2 | 1 | 2 | 2 | 3 | 2 | 2 | 1 | 1 |
| 6 month irradiation | 3 | 3 | 3 | 3 | 2 | 3 | 2 | 3 | 3 | 4 | 3 | 3 | 2 | 2 |

We claim:

1. A polyacetal resin composition comprising a blend of:
   (A) 100 parts by weight of a polyacetal resin, with
   (C) 0.01 to 2.0 parts by weight of a UV absorber and,
   (D) 0.01 to 1 part by weight of a low-molecular hindered amine series substance (D-1) having a molecular weight of less than 700 and 0.01 to 4 parts by weight of a high-molecular hindered amine series substance (D-2) having a molecular weight of 700 or more.

2. A polyacetal resin composition as set forth in claim 1, wherein the UV absorber (C) is a benzotriazole series substance and/or a benzophenone series substance.

3. A polyacetal resin composition as set forth in claim 1, wherein the low-molecular hindered amine series substance (D-1) is present in an amount between 0.02 to 1 part by weight per 100 parts by weight of the polyacetal resin, and the high-molecular hindered amine series substance (D-2) is present in an amount between 0.93 to 1.5 part by weight per 100 parts by weight of the polyacetal resin.

4. A polyacetal resin composition as set forth in claim 1, wherein (D) is (D-2) and the molecular weight of the high-molecular hindered amine series substance (D-2) is 1000 or more.

5. A polyacetal resin composition as set forth in claim 1, wherein the total amount of two kinds of the hindered amine series substances (D) is 0.02 to 5.0 parts by weight per 100 parts by weight of the polyacetal resin, and the ratio of the low-molecular substance (D-1) to the high-molecular substance (D-2) is between 1:1 to 1:5.

6. A colored polyacetal resin composition which comprises a blend of the composition as set forth in claim 1 with 0.1 to 4 parts by weight, per 100 parts by weight of the polyacetal resin, of a coloring component (F).

7. A polyacetal resin composition as set forth in claim 1, wherein 0.1 to 10 parts by weight of an oxyalkylene polymer (E) having chains of 2 to 8 consecutive carbon atoms is further blended.

8. A polyacetal resin composition as set forth in claim 1, further comprising:
   (B) 1 to 50 parts by weight of a core-shell polymer having a core of a rubbery polymer and a shell of a glassy polymer consisting of a vinyl copolymer having an oxygen-containing polar group, and
   (E) 0.1 to 10 parts by weight of an oxyalkylene polymer having chains of 2 to 8 consecutive carbon atoms.

9. A polyacetal resin composition as set forth in claim 8, wherein one constitutional component for the vinyl copolymer having the oxygen-containing polar group in the core-shell polymer (B) is (metha)acrylate of an alcohol having two or more oxygen-containing polar groups in a molecule.

10. A polyacetal resin composition as set forth in claim 9, wherein the oxygen-containing polar group in the core-shell polymer (B) is a hydroxyl group and/or a glycidyl group.

11. A polyacetal resin composition as set forth in claim 9, wherein (metha) acrylate in the core-shell polymer (B) is hydroxyeythyl methacrylate or glycidyl methacrylate.

12. A polyacetal resin composition as set forth in claim 8, wherein the core-shell polymer (B) having a core of a rubbery polymer and a shell of a glassy polymer consisting of a vinyl copolymer having an oxygen-containing polar group is prepared by emulsion polymerization with an oligomeric surfactant.

13. A polyacetal resin composition as set forth in claim 8, wherein the core-shell polymer (B) having a core of a rubbery polymer and a shell of a glassy polymer consisting of a vinyl copolymer having an oxygen-containing polar group is prepared by emulsion polymerization with a nonionic surfactant.

14. A polyacetal resin composition as set forth in claims 7 or 8, wherein the oxyalkylene polymer (E) is at least one member selected from the group consisting of poly(ethylene oxide), poly(propylene oxide) and an ethylene oxide-propylene oxide copolymer.

15. A colored polyacetal resin composition which comprises a blend of the composition as set forth in claim 8 with 0.1 to 4 parts by weight, per 100 parts by weight of the polyacetal resin, of a coloring component (F).

16. A molded article having a low glossiness which is comprised of the polyacetal resin composition as set forth in claims 1 or 8.

17. A molded article as set forth in claim 16, having a surface glossiness of 30% or less.

* * * * *